United States Patent
Chandhok et al.

(10) Patent No.: US 7,647,353 B2
(45) Date of Patent: Jan. 12, 2010

(54) EVENT SEARCHING

(75) Inventors: Nikhil Chandhok, New York, NY (US);
Peter Solderitsch, Havertown, PA (US);
Michael Gordon, Brooklyn, NY (US);
Philo Juang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 11/559,469

(22) Filed: Nov. 14, 2006

(65) Prior Publication Data
US 2008/0114749 A1    May 15, 2008

(51) Int. Cl.
*G06F 17/30* (2006.01)
*G06F 7/00* (2006.01)

(52) U.S. Cl. .................. 707/104.1; 707/101; 707/5

(58) Field of Classification Search .............. 707/104.1, 707/101, 5
See application file for complete search history.

(56) References Cited

U.S. PATENT DOCUMENTS

| | | | |
|---|---|---|---|
| 5,475,844 A * | 12/1995 | Shiramizu et al. | ........... 718/104 |
| 2004/0078252 A1 | 4/2004 | Daughtrey et al. | |
| 2004/0093290 A1 | 5/2004 | Doss et al. | |
| 2005/0044066 A1 | 2/2005 | Hooper et al. | |
| 2005/0203878 A1 | 9/2005 | Brill et al. | |
| 2005/0209860 A1 | 9/2005 | Beaufort et al. | |
| 2005/0278052 A1 * | 12/2005 | Bett et al. | .................... 700/108 |
| 2006/0074865 A1 | 4/2006 | Merrigan et al. | |
| 2006/0106825 A1 * | 5/2006 | Cozzi | ......................... 707/100 |
| 2006/0173841 A1 * | 8/2006 | Bill | .............................. 707/6 |
| 2006/0235674 A1 * | 10/2006 | Voigt | ........................... 703/17 |

FOREIGN PATENT DOCUMENTS

KR    10-2001-0095841    11/2001

OTHER PUBLICATIONS

International Search Report dated Apr. 29, 2008. PCT Application No. PCT/US2007/084686.
European Search Report dated Oct. 16, 2009 for European Application No. 07864396.2.

* cited by examiner

*Primary Examiner*—Kuen S Lu
(74) *Attorney, Agent, or Firm*—Fish & Richardson P.C.

(57) ABSTRACT

Events can be searched by identifying a query that includes a time interval and a search component, determining a time increment associated with the time interval, and partitioning the time interval into partitions based on the time increment. For each partition, a relevance of each event in a collection of events that occur at a time in the partition is determined based on the query. A pre-determined number of the relevant events are displayed.

63 Claims, 10 Drawing Sheets

| Time Information | Place Information | Content |
|---|---|---|
| 1/1/06 | Brooklyn Bridge, NY | "Come join us in a walk for charity! Sponsored by the United Way." |
| 1/2/06 | Las Vegas, NV | "Test your skills in a poker tournament at the New York, New York hotel and casino. Sponsored by Johnnie Walker." |
| 1/3/06 | New York, NY | "See the sites on a Central Park walking tour." |
| 1/4/06 | San Diego, CA | "See the sites on a Balboa Park walking tour." |
| 1/5/06 | New York, NY | "Patent law seminar. Door prizes will be given." |
| 1/6/06 | New York, NY | "Jury Duty Recovery Group. After the verdict, run, don't walk, to our recovery group." |

1. When: 1/1/06
   Where: Brooklyn Bridge, NY
   What: Come join us in a walk for charity! Sponsored by the United Way.

2. When: 1/3/06
   Where: New York, NY
   What: See the sites on a Central Park walking tour

| Week of 1/1/2006 | | | | |
|---|---|---|---|---|
| 1/1/2006 | 1/2/2006 | 1/3/2006 | 1/4/2006 | 1/5/2006 |
| Where: Brooklyn Bridge, NY<br><br>What: Come join us in a walk for charity! Sponsored by the United Way. | | Where: New York, NY<br><br>What: See the sites on a Central Park walking tour | | |

EVENT SEARCHING

TECHNICAL FIELD

This disclosure relates to event searching.

BACKGROUND

Searchable information may include descriptions of events. An "event" can be an occurrence of certain activity or conduct at a certain time and place. For example, events can include artistic performances, informational lectures, auctions, opportunities to meet an individual, private social gatherings, etc. Often, events are described in advance of their occurrence, for example by a promoter or host of the event, a news source, or another person.

SUMMARY

In general, in one aspect: identifying a query, the query including a time interval and a search component; determining a time increment associated with the time interval; partitioning, based on the time increment, the time interval into partitions; for each partition, determining, based on the query, a relevance of each event in a collection of events, all of which occur at a time in the partition; and displaying a pre-determined number of the relevant events.

Implementations may include one or more of the following features: Determining a time increment includes determining a time increment based on the query. Determining the relevance of each event is based on the search component of the query. The query also includes a place component that describes a place, and for each partition, and the collection of events includes events that occur within a pre-determined relationship with the place. The pre-determined relationship includes a geographical proximity. Determining the relevance of an event includes determining a numerical relevance of the event. Also including generating the query. The query is randomly generated. The search component of the query is randomly generated. The query is generated based on a property of a user. The property includes a query-history of the user. The search component of the query is generated based on the query-history of the user. The search component of the query is supplied by a user, and the time interval of the query is automatically generated. Also including successively generating two queries, each of which having the same search component supplied by the user.

In general, in another aspect: identifying an event described by an electronic document, wherein identifying the event includes identifying a time or times at which the event occurs, a place or places at which the event occurs, and content from the electronic document, the content describing the event; and recording the time or times at which the event occurs, the place or places at which the event occurs, and the content describing the event on a computer readable medium.

Implementations may include one or more of the following features. Also including identifying the electronic document by using a crawler on a computer network. The computer network includes a world wide web. The electronic document is expressed in a structured language, and the event is identified using a structure of the language. The structured language includes extensible markup language, and the event is identified using tags in the structured language. The electronic document describes a calendar, and the event includes an invent in the calendar. The event is identified from a syndicated feed. The syndicated feed includes an RSS feed. Also including determining a relevance of the event with respect to a pre-determined query, the query being determined prior to identifying the event.

In general, in another aspect: identifying a query, the query including a time interval and a search component; identifying one or more partitions based on the time interval; for each partition, determining events based on the search component; and displaying the events for each partition.

Implementations may include one or more of the following features. The query also includes a place component that describes a place, and for each partition, and the collection of events includes events that occur within a pre-determined relationship with the place. The pre-determined relationship includes a geographical proximity. Also including generating the query. The query is randomly generated. The search component of the query is randomly generated. The query is generated based on a property of a user. The property includes a query-history of the user. The search component of the query is generated based on the query-history of the user. The search component of the query is supplied by a user, and the time interval of the query is automatically generated. Also including successively generating two queries, each of which having the same search component supplied by the user.

Other aspects include other combinations of the features recited above and other features, expressed as methods, apparatus, systems, computer-readable media, program products, and in other ways. Other features and advantages will be apparent from the description and from the claims.

DESCRIPTION OF DRAWINGS

FIG. 6A is an exemplary set of event data.

FIGS. 6B and 6C are schematic depictions of output from the event search system.

FIGS. 7A-D are exemplary outputs from the event search system.

DETAILED DESCRIPTION

Many types of events are described electronically and available for searching over a computer network, such as the world wide web. When searching for events, one is often interested in events that occur during a given time interval or in a given place. Using traditional search techniques, it can sometimes be cumbersome to identify events of interest that are occurring in the desired time or place. For example, if one were to search for musical performances of the band Chicago near the city of Boston using some traditional search techniques, the search results may include musical performances of the band Boston near the city Chicago.

Moreover, even if search results describe events that all occur in the specified location, one is sometimes interested in seeing events that occur at times that are spread out across a time interval. For example, if one is interested in events that take place at a local venue throughout the week, search results about a popular event that occurs on Saturday night may be numerous, while search results about a less popular event that occurs on Wednesday afternoon may be less numerous. In such a situation, one may have to examine several search results about the popular event before finding search results about the less popular event. This can be time consuming.

Among other things, the techniques described below help find events occurring within a specified time interval in a specified location.

Figure 1:
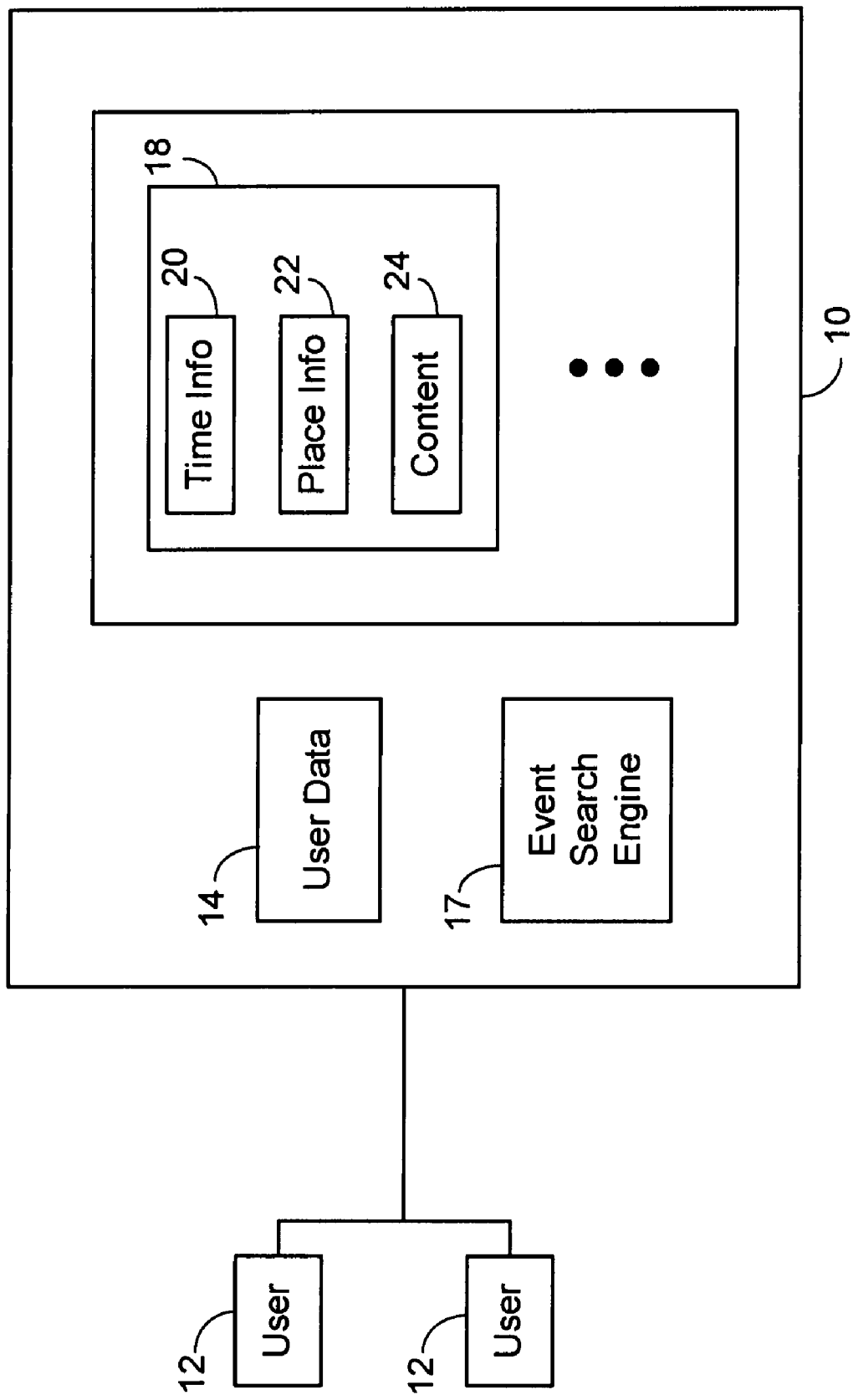
FIG. 1 is a schematic depiction of an exemplary event search system.

FIG. 1 is a schematic depiction of an exemplary event search system 10. The event search system 10 can accommodate one or more (e.g., several) users 12. Each user 12 is in data communication with the event search system 10. The data communication may be implemented in any way, for example wirelessly, over a network, by direct physical connection using metallic wire or fiber optic cable, etc. The event search system 10 includes user data 14, event data 16, and an event search engine 17.

A user 12 can (but need not) register with the event search system 10. If the user 12 registers, the user 12 provides the event search system 10 with information, for example a username, a password, a default language or geographic location, etc. Moreover, the event search system 10 may determine other information about the user 12, which may also be stored as user data 14. For example, the event search system 10 may determine the user's current geographic location based on an internet protocol ("IP") address of the user 12, etc.

The event data 16 includes descriptions of one or more (e.g., several) events 18. In one implementation, each event 18 includes time information 20, place information 22, and content 24. The time information 20 includes information pertinent to the time at which the event occurs. In some implementations, the time information 20 can include a starting time for an associated event 18, an ending time for the event 18, or a duration of the event 18. As used herein, the terms "starting time" and "ending time" refer to uniquely specified moments. In particular, specifying a "starting time" or "ending time" should be understood to also include specifying a starting or ending day, month, year, etc. The events 18 described by the event data 16 need not occur in any specified relation to any particular moment of time. In particular, at any particular moment, the event data 16 may describe events 18 that have already occurred, are presently occurring, or will occur in the future.

The place information 22 includes information pertinent to the place at which the event occurs. In some implementations, the place information 20 can include a description of a geographic location or region, such as a street address, global coordinates (e.g., latitude and longitude), a popular name of a geographic location or region (such as "The Alamo"), a specified displacement from another geographic location, etc. In some implementations, the place information 20 can refer to or include an IP address of a computer, a uniform resource locator ("URL"), a computer name on a network, etc (e.g., when the event is a broadcast event over the Internet). In some implementations, place information 22 can identify a broadcast medium or a broadcast source for the event 18.

The content 24 can include description of the nature of the event 18. For example, the content 24 of a barbeque competition event 18 may include a list of participants, a list of prizes, a list of musical performances to occur at the competition, rules of the competition, entry fees, etc. The content 24 need not be limited to text. In some implementations, for example, the content 24 may include graphic, video, audio, or other non-textual information. In some implementations, the content 24 may include internal structure. For example, the content 24 may specify particular information about the event 18 (for example, an event title, an event host, an event type, etc.) in metadata or structured fields within the content 24.

Figure 2:
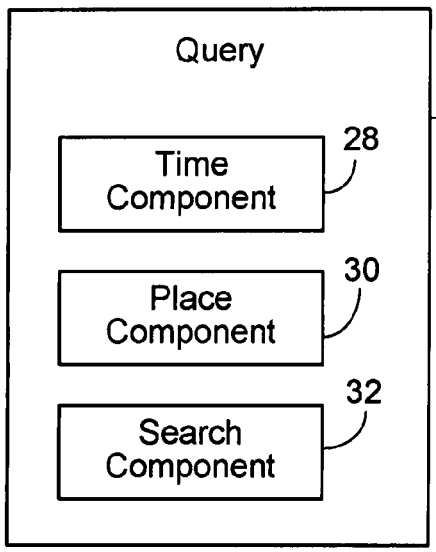
FIG. 2 is a schematic depiction of an exemplary query.

FIG. 2 is a schematic depiction of an exemplary query 26. The query 26 includes a time component 28, a place component 30, and a search component 32. The time component 28 includes a description of a time interval. In some implementations, the time component 28 also includes one or more (e.g., several) increments into which the time interval is partitioned, or into which partitions are further partitioned. For example, the time interval may be one week, a time increment may be one day, and a second time increment may be one hour. The place component 30 includes an at least partial description of a place, for example a geographic location, etc. The search component 32 can include any information, such as one or more (e.g., several) search terms. Though reference is made to a query 26 that includes all three components 28-32, not all are required. Lesser numbers and different components are possible.

Figure 3:
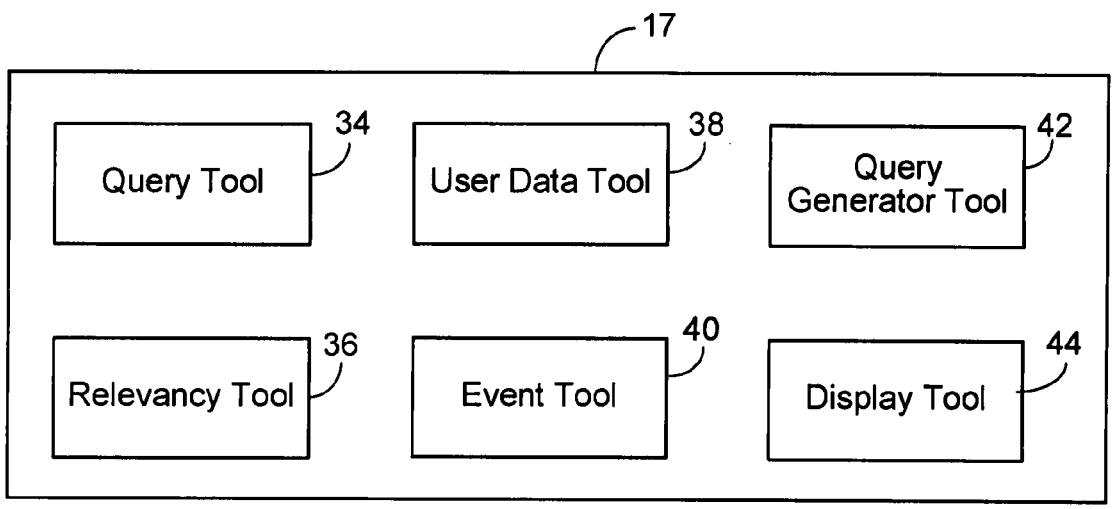
FIG. 3 is a schematic depiction of an exemplary event search engine.

FIG. 3 is a schematic depiction of an exemplary event search engine 17. The event search engine 17 includes a query tool 34, a relevancy tool 36, a user data tool 38, an event tool 40, a query generator tool 42, and a display tool 44.

The query tool 34 is operable to gather information based on the query 26 and route the information among other components 36-44 of the event search engine 17. In some implementations, the query tool 34 can: retrieve events 18 from the event data 16 that occur within the time interval specified in the time component 28 of the query 26; retrieve events 18 from the event data 16 that occur within the place specified in the place component 30 of the query 26; and pass these events 18 to the relevancy tool 36. In some implementations, the query tool 34 can route the query 26 to the user data tool 38. This may occur, for example, if the query 26 is specified by the user 12, and the user 12 does not specify a place component 30.

In some implementations, the query tool 34 is configured to hierarchically recognize places, so that when a specific place (e.g., The Alamo) is within another more general place (e.g., San Antonio, Tex.), both places are recognized as relevant to a query 26 specifying the general place as its place component 30.

The relevancy tool 36 is operable to determine a relevancy measure of an event 18 with respect to a query 26. In some implementations, the relevancy of an event 18 with respect to a query 26 can be based on a comparison of the content 24 associated with the event 18 to the search component 32 of the query 26. For example, a numerical measure of relevancy can be determined based on this comparison.

The user data tool 38 is operable to read from or write to the user data 14. In some implementations, the user data tool 38 can provide missing values to an input from a user 12 to complete a query 26. For example, if the user 12 specifies a search component 32, but not a time component 28 or a place component 30, the user data tool 38 may provide default data for a time component 28 and a place component 30 based on information in the user data 14. In some implementations, the default value for the place component 30 is the user's geographic location.

The event tool 40 is operable to read from or write to the event data 16. In some implementations, the event tool 40 can operate as an event crawler. That is, the event tool 40 can be operable to examine electronic documents on a network, determine whether the documents describe one or more events 18, and if so, record the events 18 in the event data 16. In some implementations, such documents are written in a structured language. In some implementations, for example, the event tool 40 can determine time information 20 and/or place information 22 of an event 18 based on the structured extensible markup language ("XML") in a document describing the event 18.

In general, however, there is no requirement that a document be expressed in a particular format or language. In particular, the web crawler can identify events 18 described in plain text documents.

In some implementations, the event tool 40 is configured to receive descriptions of events from previously-identified event feeds. For example, syndication sources may provide streams of events 18 via the really simple syndication ("RSS") protocol. In this case, the event tool 40 can be operable to determine the time information 20, the place information 22, and the content 24 for events 18 described in the feed.

In some implementations, the event tool 40 is configured to include user-specified events 18 in the event data 16. For example, if the user 12 maintains a personal calendar on the event search system 10 or elsewhere, the user 12 may allow some or all of the events recorded on the calendar to be searchable by some or all of the other users 12 of the event search system 10.

The query generator tool 42 is operable to generate a query 26 for the user 12. In some implementations, the query generator tool 42 generates a query 26 with a place component 30 based on the geographic location of the user 12. For example, the user 12 may use the query generator tool 42 if the user 12 is curious as to what events 18 are occurring in his geographic vicinity. In some implementations, the search component 32 of the query 26 is based on search components 32 of queries from the user 12 or other users 12. For example, the query generator tool 42 can generate a search component 32 based on popular search components 32 from other users 12.

In some implementations, the search component 32 of the query 26 is generated based on the habits of the user 12. The habits of the user 12 may be recorded in the user data 14. For example, the questions pertinent to the user's habits may be submitted to the user 12 registers with the event search system 10, or from time to time after registration. The habits of the user may also be inferred by the user's previous use of the event search system 10. For example, a search component 32 may be generated based on the user's previously-supplied search components, based on the events 18 previously viewed by the user 12, etc.

In some implementations, the query generator tool 42 is operable to automatically and periodically generate queries 26 based on a specified search component 32 of the user 12. For example, new queries 26 with the specified search component 32 may be generated hourly, daily, weekly, etc. In some implementations, the time interval in the time component 28 of the periodically generated queries is equal to the period with which the queries 26 are generated. For example, weekly-generated queries 26 search for events occurring during that week. Thus, if a user 12 has a persistent interest in events 18 pertaining to patents, the user 12 may arrange for periodically generated queries 26, each with the search component "patents." The search component 32 may be saved, for example, in the user data 14.

The display tool 44 is operable to display output of the event search system 10 to the various users 12. For example, such output may include search results based on user-supplied or system-generated queries 26. In some implementations, the output is formatted consistently with a personal calendar maintained by a user. In some implementations, the output is delivered to the user 12 via an electronic communication, such as via a web page, e-mail, etc.

Figure 4:
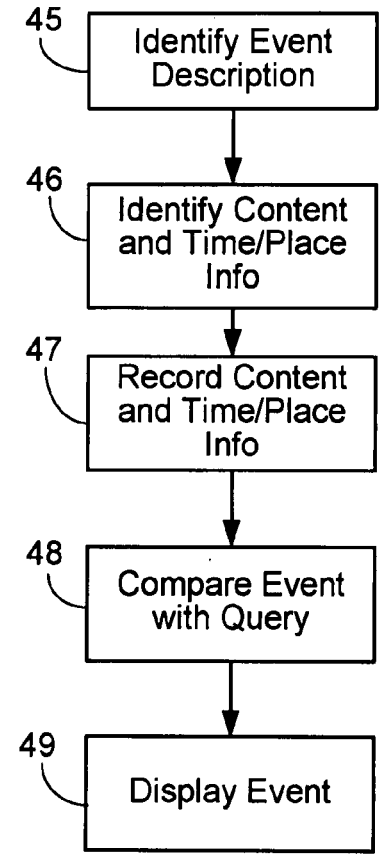
FIG. 4 is a flowchart for populating the event data.

FIG. 4 is a flowchart for populating the event data 14. First, an event description is identified (step 45). For example, the event description can be received by the event tool 40. In some implementations, the event description is received from a web crawler, an external syndication source (for example, an RSS feed), a user 12, or any combination of the these. Event descriptions may be identified from other sources. In some implementations, the event description is formatted as structured XML.

Next, time information 28, place information 30, and content 32 are determined from the event description (step 46). For example, the event tool 40 can determine the time information 28, the place information 30, and the content 32 from the event description. The time information 28, place information 30, and content 32 are then recorded (step 47). For example, the time information 28, place information 30, and content 32 can be recorded as an event 18 in the event data 16. The process can be repeated for a plurality of events that are identified for processing.

Optionally, each event 18 recorded in step 47 may be automatically compared with one or more queries 26 (step 48). For example, each event 18 may be compared with a saved search component 28 specified by a user 12. In some implementations, comparing the event 18 with the query 26 or the search component 28 includes determining a relevancy of the event 18 with respect to the search component 28. The event 18 may be automatically displayed to the user 12 (step 49). In some implementations, the event 18 is displayed to a user 12 if the relevancy of the event 18 with respect to the user's saved search component 28 is above a pre-determined threshold.

Figure 5:
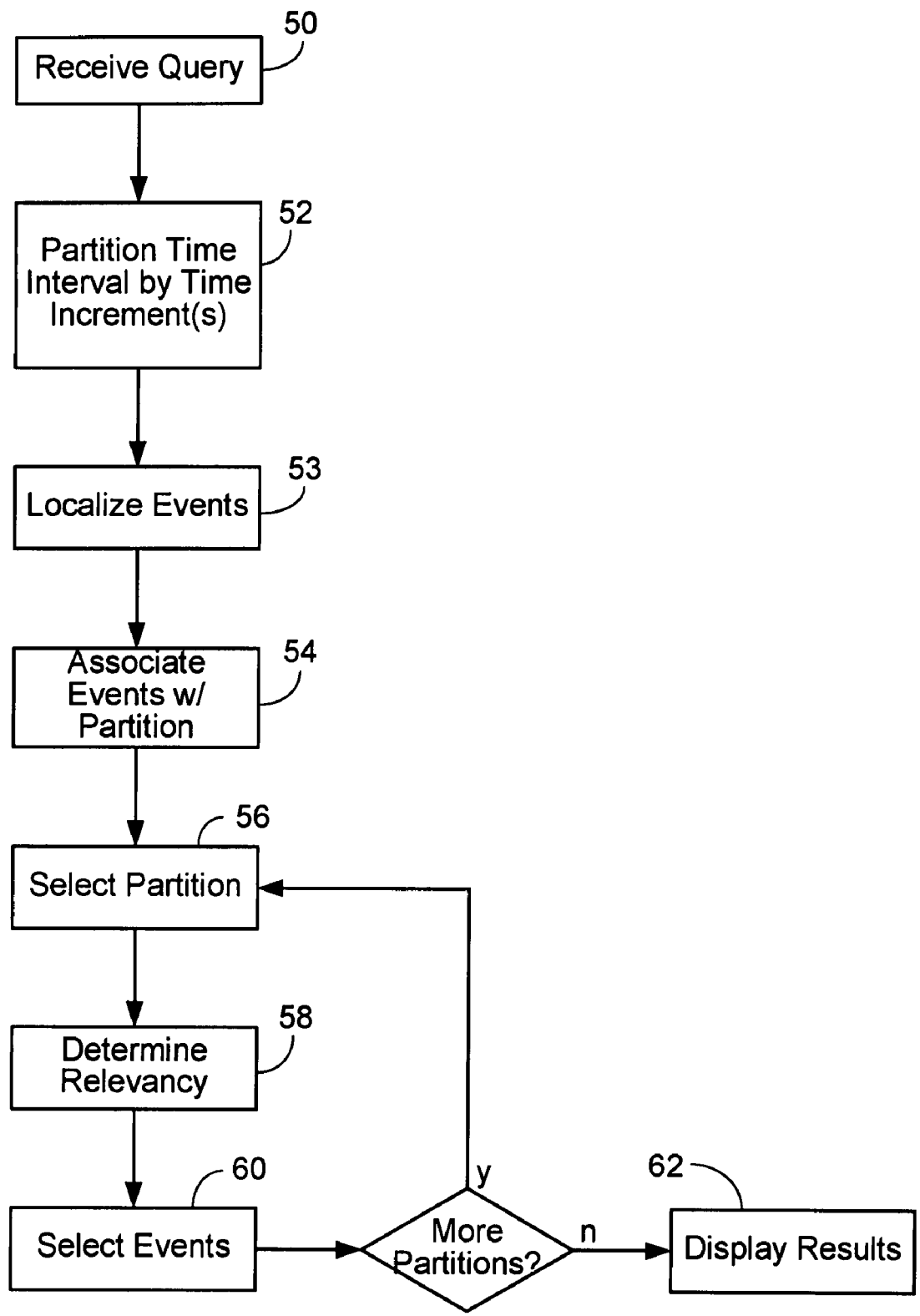
FIG. 5 is a flowchart for identifying which events from a collection of events meet a query.

FIG. 5 is a flowchart for identifying which events from a collection of events satisfy a query 26. For example, the event data 14 may describe a collection of events 18. First, a query 26 is identified (step 50). In some implementations, the query 26 is received by the query tool 34. Based on the query 26, partitions of the time interval by the time increment are identified (step 52). If no time increment was specified in the query 26, the entire time interval is treated as a single partition. In some implementations, the query tool 34 can be used to identify the partitions.

From the collection of events, events which occur at or near the place specified by the place component 30 of the query 26 are identified (step 53). In some implementations, the event tool 40 can be used to identify such events 18. The events specified in step 53 are collectively referred to as the localized collection of events, and step 53 is referred to as localizing the collection of events.

For each time partition, events from the localized collection are associated with the time partition (step 54). In some implementations, an event is associated with a time partition if the event's start time occurs during the partition. In some implementations, an event is associated with a partition if any part of the event occurs during the partition. In some implementations, events 18 occurring during a given time partition can be identified by the event tool 40. For example, the event tool 40 can identify such events based on the time component 28 of the query 26.

A partition is selected (step 56). For example, the partition may be selected by the query tool 34. For the events associated with the selected partition in step 54, a relevancy of each event to the received query 26 is optionally determined (step 58). For example, the relevancy may be determined by the relevancy tool 36. In some examples, the relevancy of each event to the search component 32 of the query 26 is determined.

Based on the relevancy determination of step 58, one or more (e.g. several) events are selected to be displayed (step 60). In some implementations, the events may be selected by the relevancy tool 36. For example, the events may be ranked according to their relevancy, and a pre-determined number of the highest-ranked events may be selected to be displayed. In another example, all events above a pre-determined relevancy threshold are selected to be displayed. Other ways of selecting events are possible.

If there are other partitions for which no events have yet been selected to be displayed, steps 56-60 are repeated for those partitions. Eventually, the events selected to be displayed in step 60 are displayed for each partition (step 62). For example, the events can be displayed by the display tool 44.

The above steps can be performed in other orders. For example, events may be associated with a time partition prior to being localized; i.e., the order of steps 53 and 54 may be reversed. Still other orders of performing the steps above are possible.

FIG. 6A is an exemplary set of event data 14. In this example, suppose the event data 14 contains six events 18 (a walk for charity, a poker tournament, a walking tour of Central Park, and a walking tour of Balboa park, a patent law seminar, and a jury duty recovery group), with time information 20, place information 22, and content 24 as shown in FIG. 6A. If an exemplary search query 26 with time component 28 indicating the time interval Jan. 1, 2006 to Jan. 5, 2006, place component 30 indicating New York, N.Y., and a search component 32 consisting of the word "walk," then the event search system 10 would display two events: the walk for charity and the central park walking tour.

FIG. 6B shows exemplary non-partitioned output 63 from the event search system 10. This output 63 is presented as a list. FIG. 6C shows exemplary output from the event search system 10 partitioned by day. This output 63 shows events 18 in partitions corresponding to the days on which the events 18 occur.

Note that, although the phrases "New York, N.Y." and "Walker" appear in the content 24 of the poker tournament event 18, this event 18 is not displayed among the search results, because its place information 22 (Las Vegas) is not at or near the place component 30 (New York) of the query 26. Conversely, note that the "walk for charity" at the Brooklyn Bridge appears among the search results, despite the textual dissimilarity of "Brooklyn Bridge" with "New York." Finally, note that the jury duty recovery group event 18 was not included in the search results, despite occurring in the proper place, and the appearance of "walk" in its content 24, because it occurs at a time that is outside the time interval specified in the time component 28 of the query 26.

Figure 7A:
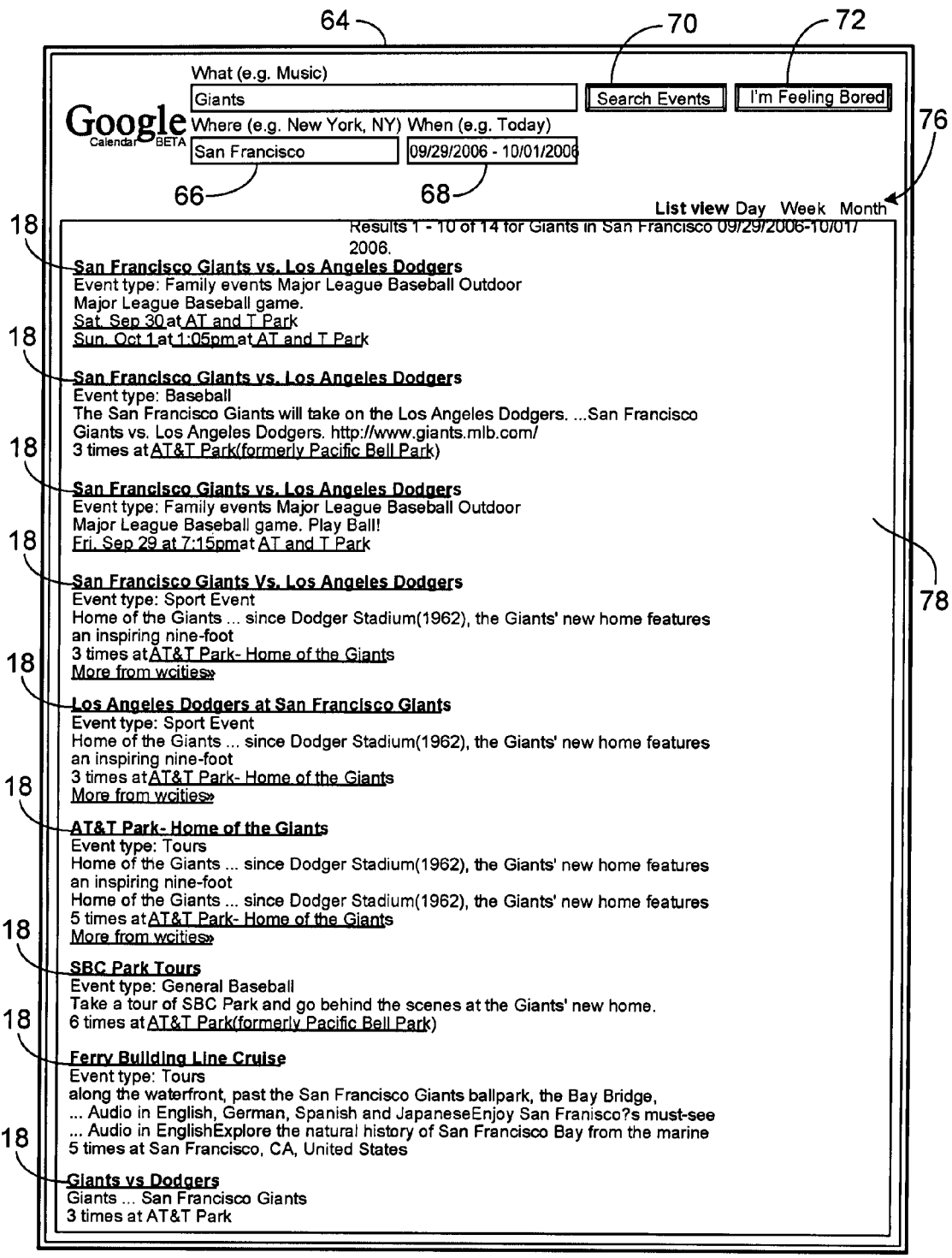
Figure 7B:
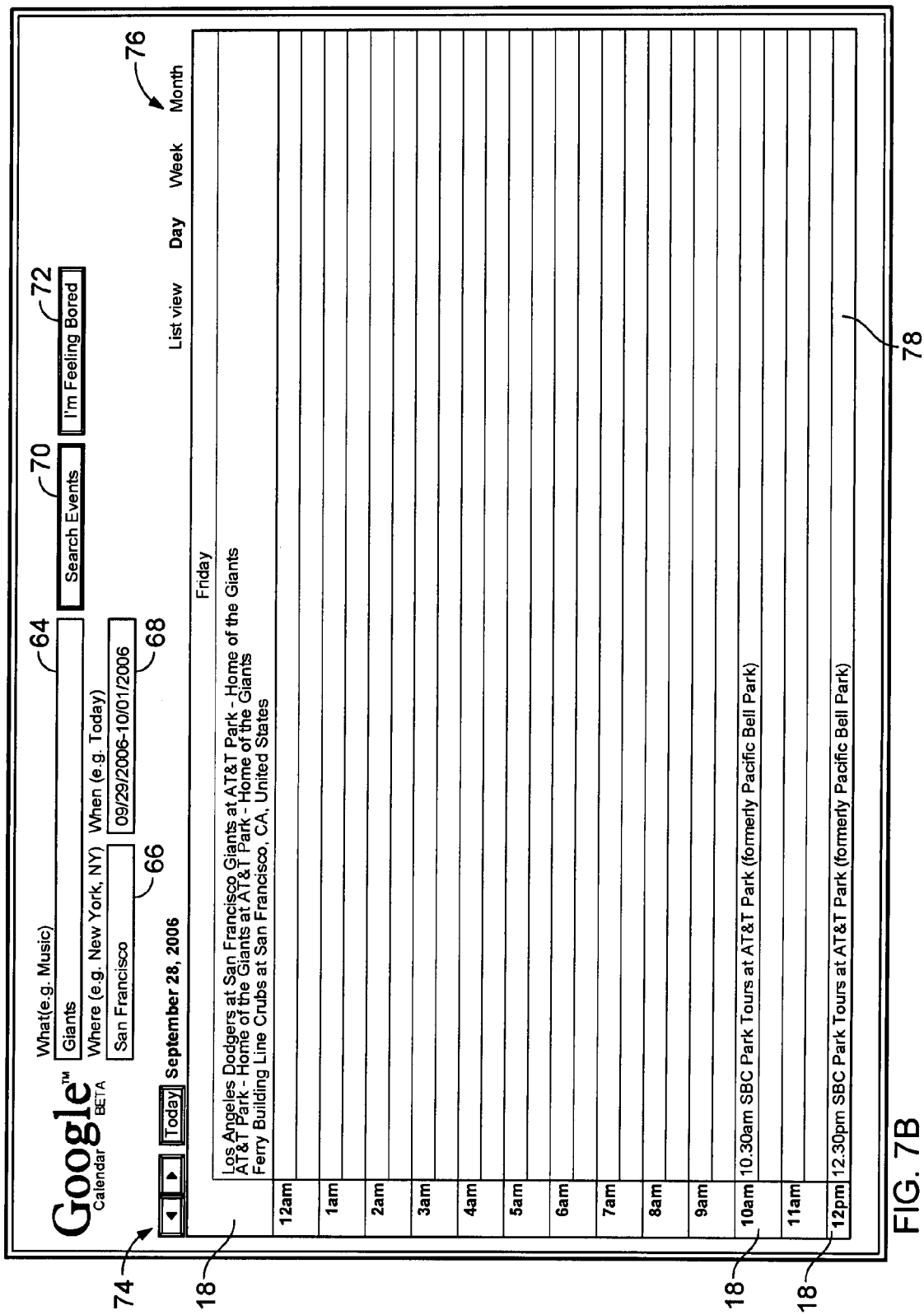
Figure 7C:
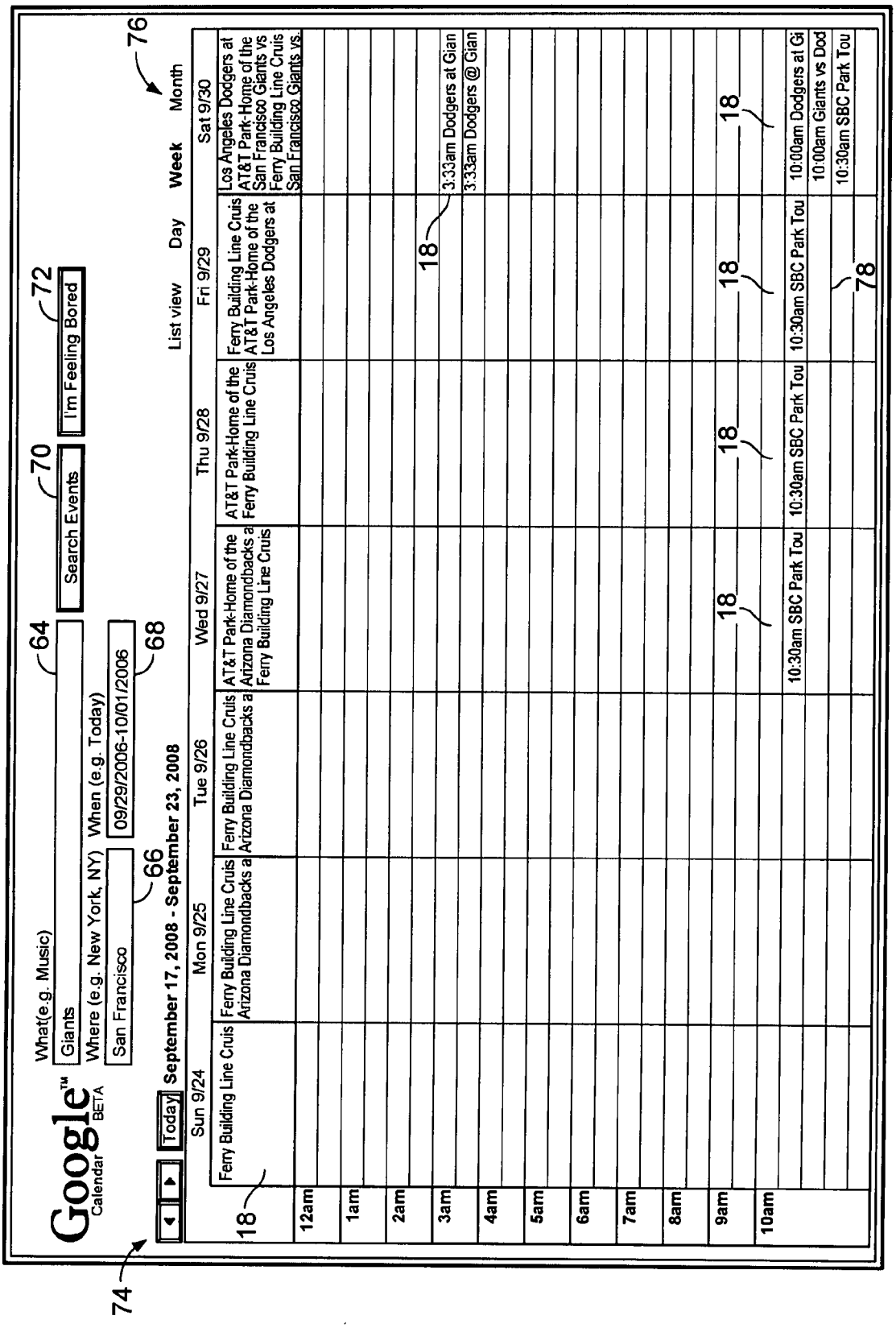
Figure 7D:
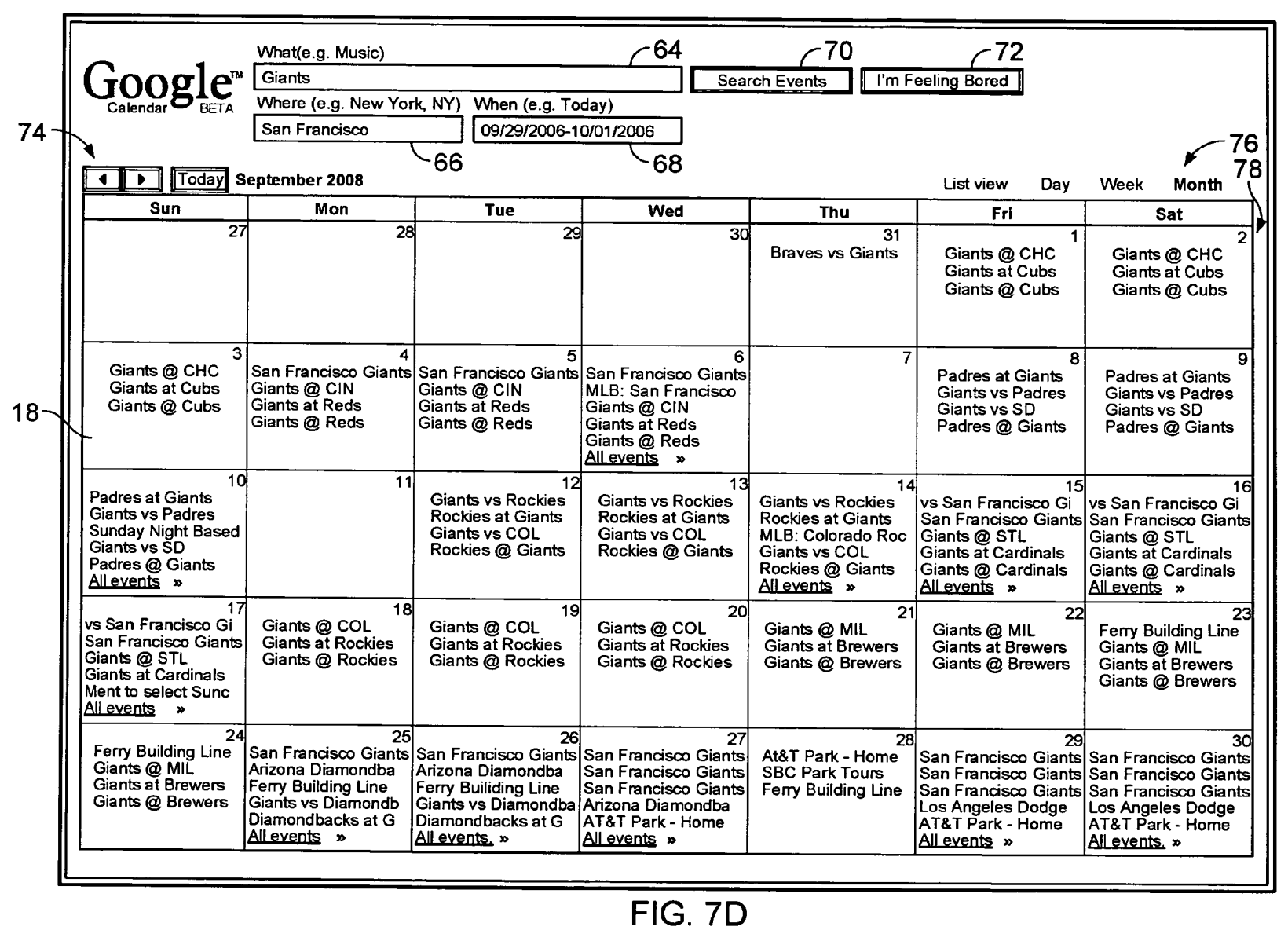

FIGS. 7A-D are screenshots of output from an event exemplary search system 10, showing exemplary events 18 from a non-partitioned time interval of three days (FIG. 7A), events 18 from a given day partitioned into hours (FIG. 7B), events 18 from a given week partitioned into days and further partitioned into hours (FIG. 7C), and events 18 from a given month partitioned into days (FIG. 7D). In some implementations, the output is provided by the display tool 44. Each screenshot may include features such as a search component field 64, a place component field 66, a time component field 68, a search button 70, an "I'm feeling bored" button 72, a navigation menu 74, a display menu 76, and a display area 78.

The search component, time component, and place component fields 64-68 are text entry field, where a user 12 can specify values for the search component 32, time component 28, and place component 30, respectively, of a query 26. The search button 70 can be used to submit a query 26 whose components 28-32 are equal to the values in the fields 64-68 to the event search system 10. In some implementations, the values in the fields 64-68 are passed to the query tool 34 when the search button 70 is activated.

The "I'm feeling bored" button 72 can be used to generate a query 26 and submit the query 26 to the event search system 10. The "I'm feeling bored" button 72 does not require any values to be entered in any of the fields 64-68. When the "I'm feeling bored" button 72 is activated, a query 26 is automatically generated based on, e.g., past queries or randomly generated and submitted to the event search system 10. In some implementations, activating the "I'm feeling bored" button 72 calls the query generator tool 42.

The navigation menu 74 includes controls for displaying events 18 besides the ones currently in view. In some implementations, the navigation menu 74 includes controls for selecting adjacent time intervals for displaying events 18. For example, the navigation menu 74 may include controls for displaying events 18 that occur during the next or previous day (see FIG. 7B), for displaying events 18 that occur during the next or previous week (see FIG. 7C), or for displaying events 18 that occur during the next or previous month (see FIG. 7D). In some implementations, the navigation menu 74 calls the query tool 34, providing a new query 26 specifying the requested time interval.

The display menu 76 includes controls for adjusting the time interval or time increment(s) within which events 18 are displayed. In some implementations, the display menu 76 includes controls for adjusting the time interval to be a month, a week, or a day. In some implementations, the display menu 76 includes a control to display the events in the time interval without partitioning the time interval; i.e., as a list. In some implementations, the controls in the display menu 76 call the query tool 34, providing the query tool 34 with a new time interval for a previously-submitted query 26.

The display area 78 is an area where events 18 are displayed. In some implementations, the display area 78 coincides with output from a computer program; i.e., as an overlay. In some examples, the display area 78 coincides with a personal calendar maintained by the user 12 viewing the events 18.

Figure 8:
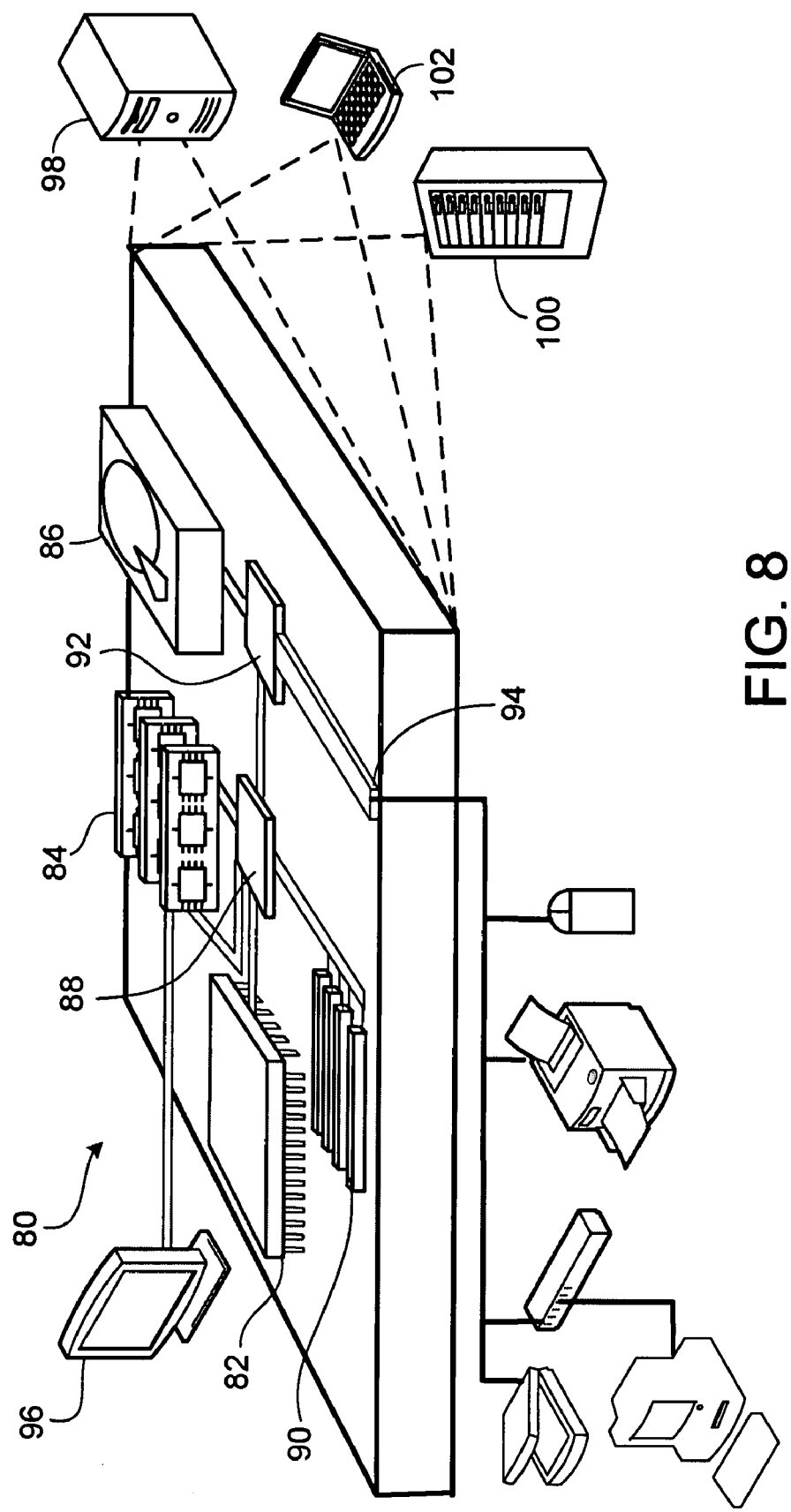
FIG. 8 is a block diagram of a computing device 80 that may be used to implement the event search system, as either a client or as a server or plurality of servers.

FIG. 8 is a block diagram of a computing device 80 that may be used to implement the event search system 10, as either a client or as a server or plurality of servers. Computing device 80 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 80 includes a processor 82, memory 84, a storage device 86, a high-speed interface 88 connecting to memory 84 and high-speed expansion ports 90, and a low-speed interface 92 connecting to low-speed bus 94 and storage device 86. Each of the components 82, 84, 86, 88, 90, and 92, are interconnected using various busses, and may be mounted on a common motherboard or in other manners as appropriate. The processor 82 can process instructions for execution within the computing device 80, including but not limited to instructions stored in the memory 84 or on the storage device 86 to display graphical information for a GUI on an external input/output device, such as display 96 coupled to high-speed interface 88. In other implementations, multiple processors and/or multiple buses may be used, as appropriate, along with multiple memories and types of memory. Also, multiple computing devices 80 may be connected, with each device providing portions of the necessary operations (e.g., as a server bank, a group of blade servers, or a multi-processor system).

The memory 84 stores information within the computing device 80. In one implementation, the memory 84 is a computer-readable medium. In one implementation, the memory 84 is a volatile memory unit or units. In another implementation, the memory 84 is a non-volatile memory unit or units.

The storage device 86 is capable of providing mass storage for the computing device 80. In one implementation, the storage device 86 is a computer-readable medium. In various different implementations, the storage device 86 may be a floppy disk device, a hard disk device, an optical disk device, or a tape device, a flash memory or other similar solid state memory device, or an array of devices, including but not limited to devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 84, the storage device 86, memory on processor 82, or a propagated signal.

The high-speed interface 88 manages bandwidth-intensive operations for the computing device 80, while the low-speed interface 92 manages lower bandwidth-intensive operations. Such allocation of duties is exemplary only. In one implementation, the high-speed interface 88 is coupled to memory 84, display 96 (e.g., through a graphics processor or accelerator), and to high-speed expansion ports 90, which may accept various expansion cards (not shown). In the implementation, low-speed interface 92 is coupled to storage device 86 and low-speed bus 94. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 80 may be implemented in a number of different forms, as shown in the figure. For example, it may be implemented as a standard server 130, or multiple times in a group of such servers. It may also be implemented as part of a rack server system 100. In addition, it may be implemented in a personal computer such as a laptop computer 102.

Various implementations of the event search system 10 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the event search system 10 can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including but not limited to acoustic, speech, or tactile input.

The event search system 10 can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the event search system 10), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims.

What is claimed is:

1. A method comprising:
    selecting a query, the query including a time component that specifies a time interval, a place component that describes a place, and a search component that comprises one or more search terms;
    determining a time increment associated with the time interval;
    partitioning, based on the time increment, the time interval into partitions;
    for each partition, determining, based on the one or more search terms in the query, a measure of relevance of each event in a collection of events that occur in the partition and having a pre-determined relationship with the place; and
    displaying a pre-determined number of the relevant events.

2. The method of claim 1, wherein determining a time increment includes determining a time increment based on the query.

3. The method of claim 1, wherein determining the relevance of each event is based on the search component of the query.

4. The method of claim 1, in which the pre-determined relationship includes a geographical proximity.

5. The method of claim 1, wherein determining the relevance of an event includes determining a numerical relevance of the event.

6. The method of claim 1, further comprising generating the query.

7. The method of claim 6, wherein the query is randomly generated.

8. The method of claim 7, wherein the search component of the query is randomly generated.

9. The method of claim 6, wherein the query is generated based on a property of a user.

10. The method of claim 9, wherein the property includes a query-history of the user.

11. The method of claim 10, wherein the search component of the query is generated based on the query-history of the user.

12. The method of claim 6, wherein the search component of the query is supplied by a user, and the time interval of the query is automatically generated.

13. The method of claim 12, further comprising successively generating two queries, each of which having the same search component supplied by the user.

14. The method of claim 1 in which the time increment comprises at least one of year, month, week, day, or hour.

15. The method of claim 1 in which the partitioning comprises partitioning, based on the time increment, the time interval into partitions, the length of each partition being independent of the events in the partition.

16. The method of claim 1 in which the pre-determined relationship comprises a geographical proximity.

17. The method of claim 1 in which the query also includes the time increment, and determining the time increment comprises determining the time increment according to the time increment in the query.

18. The method of claim 1, further comprising partitioning each partition into sub-partitions based on a second time increment, and
for each sub-partition, determining, based on the one or more search terms in the query, a relevance of each event in a collection of events that occur in the sub-partition and having a pre-determined relationship with the place.

19. The method of claim 18 in which the first time increment comprises at least one of year, month, week, or day, and the second time increment comprises at least one of month, week, day, or hour, the second time increment being shorter than the first time increment.

20. A system comprising:
a computing device, comprising
a processor executing instructions to perform:
selecting a query, the query including a time component that specifies a time interval, a place component that describes a place, and a search component that comprises one or more search terms;
determining a time increment associated with the time interval;
partitioning, based on the time increment, the time interval into partitions; and
determining, for each partition, based on the one or more search terms in the search component, a measure of relevance of each event in a collection of events that occur in the partition and having a pre-determined relationship with the place; and
a display for displaying a pre-determined number of the relevant events.

21. The system of claim 20, wherein determining a time increment includes determining a time increment based on the query.

22. The system of claim 20, wherein determining the relevance of each event comprises determining the relevance of each event based on the search component of the query.

23. The system of claim 20, in which the pre-determined relationship includes a geographical proximity.

24. The system of claim 20, wherein determining the relevance of an event includes determining a numerical relevance of the event.

25. The system of claim 20, wherein the processor executes instructions to generate the query.

26. The system of claim 25, wherein generating the query includes randomly generating the query.

27. The system of claim 25, wherein generating the query includes generating the query based on a property of a user.

28. The system of claim 27, wherein generating the query includes generating the query based on a query-history of the user.

29. The system of claim 27, wherein generating the query includes generating the search component of the query based on the query-history of the user.

30. The system of claim 25, wherein the search component of the query is supplied by a user, and generating the query includes generating the time interval of the query.

31. The system of claim 20 in which the time increment comprises at least one of year, month, week, day, or hour.

32. The system of claim 20 in which the partitioning comprises partitioning, based on the time increment, the time interval into partitions, the length of each partition being independent of the events in the partition.

33. The system of claim 20 in which the pre-determined relationship comprises a geographical proximity.

34. The system of claim 20 in which the query also includes the time increment, and determining the time increment comprises determining the time increment according to the time increment in the query.

35. The system of claim 20 in which the processor also executes instructions to perform partitioning each partition into sub-partitions based on a second time increment, and
for each sub-partition, determining, based on the one or more search terms in the query, a relevance of each event in a collection of events that occur in the sub-partition and having a pre-determined relationship with the place.

36. The system of claim 35 in which the first time increment comprises at least one of year, month, week, or day, and the second time increment comprises at least one of month, week, day, or hour, the second time increment being shorter than the first time increment.

37. A computer-readable storage medium bearing instructions that, when executed, cause a computer to:
select a query, the query including a time component that specifies a time interval, a place component that describes a place, and a search component that comprises one or more search terms;
determine a time increment associated with the time interval;
partition, based on the time increment, the time interval into partitions; determine, for each partition, based on the one or more search terms in the search component, a measure of relevance of each event in a collection of events that occur in the partition and having a pre-determined relationship with the place; and
display a pre-determined number of the relevant events.

38. The computer-readable storage medium of claim 37, wherein the instructions for determining a time increment includes instructions for determining a time increment based on the query.

39. The computer-readable storage medium of claim 37, wherein the instructions for determining the relevance of each event includes instructions to determine the relevance of each event based on the search component of the query.

40. The computer-readable medium of claim 37, in which the pre-determined relationship includes a geographical proximity.

41. The computer-readable storage medium of claim 37, wherein the instructions for determining the relevance of an event includes instructions for determining a numerical relevance of the event.

42. The computer-readable storage medium of claim 37, further comprising instructions that, when executed, cause the computer to generate the query.

43. The computer-readable storage medium of claim 42, wherein the instructions for generating the query include instructions for randomly generating the query.

44. The computer-readable storage medium of claim 42, wherein the instructions for generating the query include instructions for generating the query based on a property of a user.

45. The computer-readable storage medium of claim 44, wherein the instructions for generating the query include instructions for generating the query based on a query-history of the user.

46. The computer-readable storage medium of claim 44, wherein the instructions for generating the query include instructions for generating the search component of the query based on the query-history of the user.

47. The computer-readable storage medium of claim 42, wherein the search component of the query is supplied by a user, and the instructions for generating the query include instructions for generating the time interval of the query.

48. The computer-readable storage medium of claim 37 in which the time increment comprises at least one of year, month, week, day, or hour.

49. The computer-readable storage medium of claim 37 in which partition the time interval into partitions comprises partition, based on the time increment, the time interval into partitions, the length of each partition being independent of the events in the partition.

50. The computer-readable storage medium of claim 37 in which the pre-determined relationship comprises a geographical proximity.

51. The computer-readable storage medium of claim 37 in which the query also includes the time increment, and determine the time increment comprises determine the time increment according to the time increment in the query.

52. The computer-readable storage medium of claim 37, further comprising instructions that cause the computer to partition each partition into sub-partitions based on a second time increment, and
for each sub-partition, determine, based on the one or more search terms in the query, a relevance of each event in a collection of events that occur in the sub-partition and having a pre-determined relationship with the place.

53. The computer-readable storage medium of claim 52 in which the first time increment comprises at least one of year, month, week, or day, and the second time increment comprises at least one of month, week, day, or hour, the second time increment being shorter than the first time increment.

54. A method comprising:
selecting events associated with a calendar;
selecting a query, the query including a time interval, a place component that describes a place, and a search component that comprises one or more search terms;
partitioning, based on a time increment, the time interval into partitions;
for each partition, determining, based on the one or more search terms in the search component, a relevance of each event in a collection of events in the calendar that occur in the partition, the event having a pre-determined relationship with the place; and
displaying one or more relevant events.

55. The method of claim 54 in which the pre-determined relationship comprises a geographical proximity.

56. The method of claim 54 in which the time increment comprises at least one of year, month, week, day, or hour.

57. The method of claim 54 in which the partitioning comprises partitioning, based on the time increment, the time interval into partitions, the length of each partition being independent of the events in the partition.

58. The method of claim 54, comprising receiving the query from a user of the calendar.

59. The method of claim 54, further comprising partitioning each partition into sub-partitions based on a second time increment, and
for each sub-partition, determining, based on the search component, a relevance of each event in a collection of events in the calendar that occur in the sub-partition.

60. The method of claim 59 in which the first time increment comprises at least one of year, month, week, or day, and the second time increment comprises at least one of month, week, day, or hour, the second time increment being shorter than the first time increment.

61. The method of claim 59 in which the query includes the first and second time increments.

62. The method of claim 54 in which the query comprises the time increment.

63. The method of claim 54, in which displaying one or more relevant events comprises displaying one or more relevant events partitioned according to the time increment.

* * * * *

UNITED STATES PATENT AND TRADEMARK OFFICE
CERTIFICATE OF CORRECTION

PATENT NO. : 7,647,353 B2  Page 1 of 1
APPLICATION NO. : 11/559469
DATED : January 12, 2010
INVENTOR(S) : Chandhok et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this

Twenty-eighth Day of December, 2010

David J. Kappos
*Director of the United States Patent and Trademark Office*